United States Patent [19]

Fontana, Jr. et al.

[11] Patent Number: 4,879,619
[45] Date of Patent: Nov. 7, 1989

[54] MAGNETORESISTIVE READ TRANSDUCER

[75] Inventors: Robert E. Fontana, Jr., San Jose; James K. Howard, Morgan Hill; James H. Lee; Haralambos Lefakis, both of San Jose, all of Calif.

[73] Assignee: International Business Machines Corporation, Armonk, N.Y.

[21] Appl. No.: 173,956

[22] Filed: Mar. 28, 1988

[51] Int. Cl.$^4$ .............................................. G11B 5/39
[52] U.S. Cl. .................................................... 360/113
[58] Field of Search ........................................ 360/113

[56] References Cited

U.S. PATENT DOCUMENTS

| | | | |
|---|---|---|---|
| 3,814,863 | 6/1974 | O'Day et al. | 360/113 |
| 3,864,751 | 2/1975 | Beaulieu et al. | 360/113 |
| 3,967,368 | 7/1976 | Brock et al. | 29/603 |
| 4,663,685 | 5/1987 | Tsang | 360/113 |
| 4,713,708 | 12/1987 | Krounbi et al. | 360/113 |
| 4,755,897 | 7/1988 | Howard | 360/113 |
| 4,800,457 | 1/1989 | Kryder et al. | 360/113 |

Primary Examiner—Robert S. Tupper
Attorney, Agent, or Firm—Otto Schmid, Jr.

[57] ABSTRACT

A magnetoresistive (MR) read transducer comprising a thin film MR layer formed of ferromagnetic material and a nonmagnetic thin film spacer layer in contact with the MR layer. The spacer layer comprises a material selected from the group consisting of nichrome and nichrome with chromium oxide. A thin film of soft magnetic material is deposited in contact with the spacer layer so that a transverse bias is produced in at least a part of the MR layer. A feature of the invention is that the resistivity of the spacer layer can be chosen by selected the ration of nichrome to chromium oxide in the spacer layer. In a specific embodiment the spacer layer extends over only the central region of the MR layer. In case the MR layer is a nickel based alloy, a wet chemical etching process using an etchant comprising an aqueous solution of ceric ammonium nitrate and acetic acid can be used pattern the spacer layer.

4 Claims, 3 Drawing Sheets

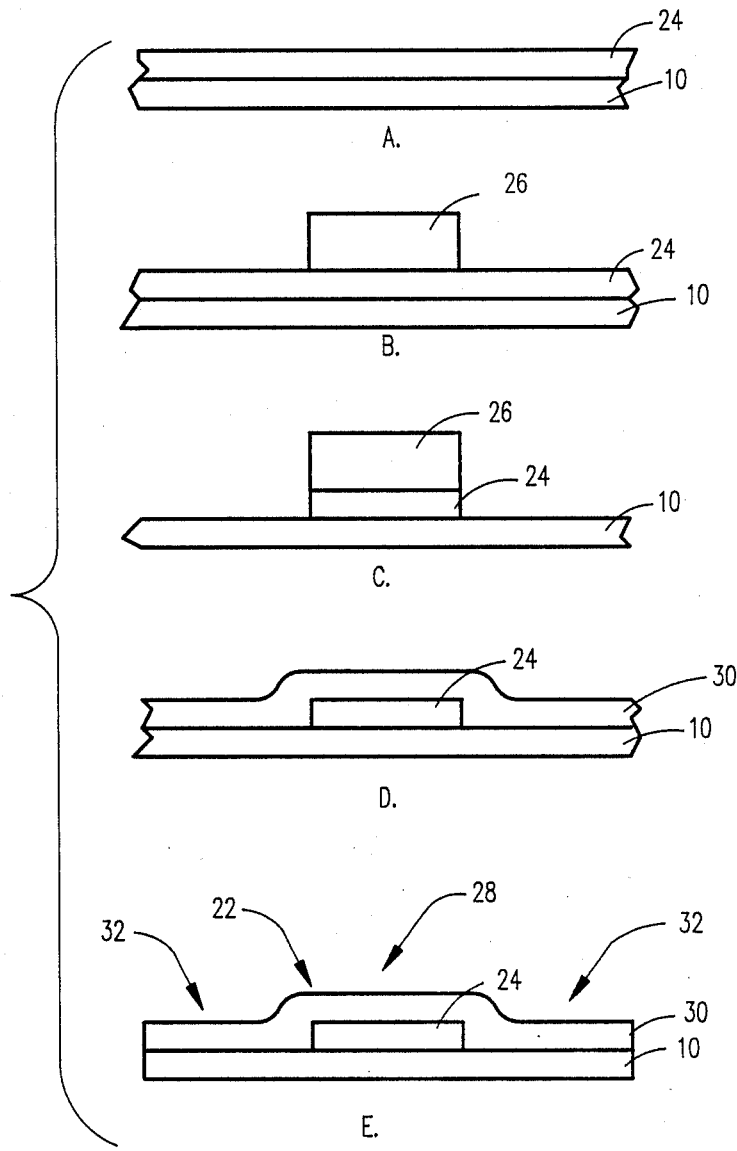

MAGNETORESISTIVE READ TRANSDUCER

DESCRIPTION

1. Field of the Invention

This invention relates in general to magnetic transducers for reading information signals from a magnetic medium and, in particular, to an improved magnetoresistive read transducer.

2. Description of the Prior Art

The prior art discloses a magnetic transducer referred to as a magnetoresistive (MR) sensor or head which has been shown to be capable of reading data from a magnetic surface at great linear densities. An MR sensor detects magnetic field signals through the resistance changes of a read element made from a magnetoresistive material as a function of the amount and direction of magnetic flux being sensed by the element.

The prior art also teaches that in order for an MR element to operate optimally, certain bias fields should be provided. In order to bias the MR element so that its response to a flux field is linear, a transverse bias field is generally provided. This bias field is normal to the plane of the magnetic media and parallel to the surface of the planar MR element.

U.S. Pat. No. 3,864,751 shows an MR read transducer in which transverse bias is produced by a soft magnetic bias film which is spaced from the MR element by an insulating layer. The material disclosed for the insulating layer is silicon dioxide about 2000 angstroms thick.

U.S. Pat. Nos. 3,814,863 and 3,967,368 disclose an MR read transducer in which the MR element is in contact with a high resistivity non-magnetic shunt film, and the MR element is magnetically biased by a portion of the MR sense current being shunted through the non-magnetic layer. The preferred material for the shunt film is titanium, and chromium is disclosed as an unsuitable material for the shunt film.

U.S. Pat. No. 4,663,685 discloses an MR read transducer in which transverse bias is produced by a soft magnetic film which is spaced from the MR element by a non-magnetic spacer layer. The preferred material for the spacer layer is tantalum, but $Al_2O_3$ and $SiO_2$ could also be used.

Commonly assigned pending patent application Ser. No. 06/926,076, filed Oct. 31, 1986, "Magnetoresistive Read Transducer" by Krounbi et al discloses an MR read transducer in which transverse bias is provided by a soft magnetic film which is spaced from the MR element in the central region only of the MR element. The preferred material for the spacer layer is tantalum.

The MR sensors disclosed in the '685 patent and the Krounbi et al application can be made having operating parameters which have successfully met the requirements for magnetic recording systems up to the present. However, to further enhance the operating parameters, it would be desirable to more closely control the resistivity characteristics of the spacer layer in terms of resistivity stability, in terms of the ability to select a resistivity over a broad value range, and in terms of a spacer layer the processing steps of which are compatible with the processing steps utilized in fabricating an associated magnetic write head.

SUMMARY OF THE INVENTION

It is therefore the principal object of this invention to provide a magnetoresistive (MR) sensor which includes a nonmagnetic spacer layer in which the resistivity characteristics can be closely controlled.

It is another object of this invention to provide a MR sensor which includes a nonmagnetic spacer layer in which the resistivity can be a specific value selected from a broad range of resistivity values.

In accordance with the invention, these objectives are achieved by providing a thin film MMR layer formed of ferromagnetic material and a nonmagnetic thin film spacer layer in contact with the MR layer. The thin film spacer layer comprises a material selected from the group consisting of nichrome and nichrome with chromium oxide. A thin film of soft magnetic material is deposited in contact with the spacer layer so that the soft magnetic material is positioned parallel to but spaced from the MR layer. This structure can produce a transverse bias in at least a part of the MR layer to maintain the transverse biased part of the MR layer in a linear response mode.

It is a further feature of this invention that the resistivity of the spacer layer can be a specific value selected from a broad range of resistivity values by selecting the ratio of nichrome to chromium oxide in the spacer layer.

In a specific embodiment, the spacer layer extends over only the central region of the MR region. In a further specific embodiment, the MR layer is a nickel based alloy, and the spacer layer is patterned by a wet chemical etching process by the use of an etchant comprising an aqueous solution of ceric ammonium nitrate and acetic acid.

The foregoing and other objects, features and advantages of the invention will be apparent from the following more particular description of a preferred embodiment of the invention as illustrated in the accompanying drawing(s).

BRIEF DESCRIPTION OF THE DRAWINGS

FIG. 4 is a diagram showing steps A through E in a specific embodiment of the process for making the magnetoresistive read transducer of FIG. 2.

DESCRIPTION OF THE PREFERRED EMBODIMENT

Figure 1:
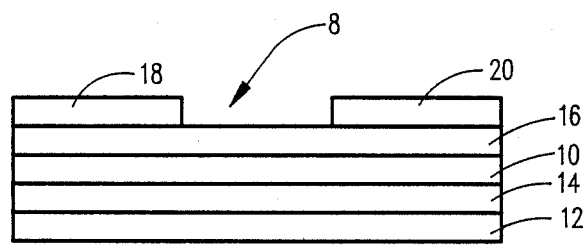
FIG. 1 is an end view of a specific embodiment of a magnetoresistive read transducer assembly according to the present invention.

A specific embodiment of the present invention will be described briefly in conjunction with FIG. 1. The magnetic read head comprises a magnetoresistive (MR) sensor 8 and transverse bias for MR sensor 8 is produced by soft magnetic film layer 12 which is separated from the MR layer 10 by a thin nonmagnetic spacer layer 14 whose purpose is to prevent a magnetic exchange bias between the MR layer 10 and soft magnetic bias film layer 12. A layer of antiferromagnetic material 16 is deposited in direct contact with MR layer 10 to provide longitudinal bias by means of exchange coupling across the interface between the MR layer 10 and antiferromagnetic layer 16 as is known in the art. Conductor leads 18, 20 are also included for connection to a sensing means (not shown) for sensing an output signal as is known in the art.

The nonmagnetic spacer layer 14 should be of considerably higher resistivity than the magnetic films it separates, so as not to shunt current from the MR layer 10. The spacer layer 14 must also be compatible with the process for manufacturing the MR sensor, and this means that the spacer layer must be deposited in situ, sequentially with the MR layer 10 and the soft magnetic bias layer 12 without vacuum break. In addition the electrical and material properties of the spacer layer 14 must be stable not only during deposition but also during subsequent process steps involving annealing at higher temperatures. The subsequent processing steps should leave the resistivity of the spacer layer 14 and the magnetic properties of the adjacent films 10 and 12 unaffected. For example, the resistivity of the spacer layer 14 could change as a result of phase and microstructure changes, and the magnetic properties of MR layer 10 and soft magnetic bias layer 12 could change should there be any atomic diffusion of the spacer material into either of the adjacent magnetic films 10 and 12, which could in turn quench the magnetic moments of the MR layer 10 and the soft magnetic bias layer 12 and shift the bias point of the MR sensor structure.

All of the above requirements are met according to the present invention, by the use of nichrome (NiCr) or nichrome with chromium oxide additions (NiCrO$_x$) as the material for nonmagnetic spacer layer 14. The material of nichrome with chromium oxide additions is specified as (NiCrO$_x$) since, even though the starting material may comprise a hot pressed target having Ni$_{80}$Cr$_{20}$ and Cr$_2$O$_3$ in a chosen ratio, it is believed that the composition of the resulting film includes one or more suboxides of chromium rather than Cr$_2$O$_3$.

In a specific embodiment, the MR layer comprises NiFe and the soft magnetic bias layer comprises NiFeRh and these films have an electrical resistivity ($\rho$) of about 25 and about 60 $\mu\Omega$-cm, respectively. The electrical resistivity $\rho$ of evaporated and sputtered nichrome films about 1000 angstroms thick is of the order of 120 $\mu\Omega$-cm, and this resistivity value is sufficiently high to be suitable for use as the spacer layer 14 between the two above-mentioned magnetic films.

Higher values of $\rho$ are even more desirable, so another feature of the present invention is the ability to obtain a spacer layer 14 with $\rho$ much higher than that of the magnetic films it separates. It has been found that deposition conditions can substantially affect the value of $\rho$ as a result of the varying amounts of oxygen incorporated in the films and the formation of chromium oxides such as Cr$_2$O$_3$ during preparation. The composition of the nichrome appears to have a considerably lesser effect on $\rho$ and the value is fairly constant within the range of about 20 to 80% at Cr.

Table I illustrates how the deposition conditions can substantially affect the value of $\rho$. This table shows that a Ni$_{80}$Cr$_{20}$ film about 1000 angstroms thick has a $\rho$ of about 100 $\mu\Omega$-cm, but a change in $\rho$ by over an order of magnitude to about 1100 $\mu\Omega$-cm can be achieved by the addition of about 20% CrO$_x$ to the film.

TABLE I

| Effect of Cr—O on Nichrome Resistivity | | |
|---|---|---|
| Composition | Thickness (Å) | Resistivity ($\mu\Omega$-cm) |
| Ni$_{80}$Cr$_{20}$ | 1000 | 100 +/− 20 |
| (Ni$_{80}$Cr$_{20}$)$_{0.8}$(CrO$_x$)$_{0.2}$ | 1000 | 1100 +/− 100 |

TABLE I-continued

| Effect of Cr—O on Nichrome Resistivity | | |
|---|---|---|
| Composition | Thickness (Å) | Resistivity ($\mu\Omega$-cm) |
| (Ni$_{80}$Cr$_{20}$)$_{0.2}$(CrO$_x$)$_{0.8}$ | 1000 | 100,000 +/− 10,000 |

To have increased flexibility in the design of MR sensors, it would be desirable to have a spacer layer the characteristics of which include the possibility of an adjustable resistivity to specific values within a broad range. This can be accomplished according to the present invention by choosing the amount of oxygen present during the deposition process and hence the concentration ratio of NiCr/Cr$_2$O$_3$. One way in which this can be done is by changing the target composition/purity. By employing vacuum cast and hot-pressed targets of various nichrome compositions, we were able to obtain films with dramatically varied resistivity values up to 1 m$\Omega$-cm.

There are a number of ways in which the amount of oxygen present in the deposition process can be established so that sputtered films having high and highly specific resistivity can be produced. One way is by adjusting the sputtering target oxygen concentration. This can be conveniently accomplished by providing vacuum cast and hot-pressed targets having a specified ratio of Cr$_2$O$_3$, such as 10% to 80%, for example, to NiCr in the target. Targets with a range of 50% to 80% Cr$_2$O$_3$ were preferred in a specific application.

Another way to establish the amount of oxygen present in the deposition process is by depositing the film in an appropriately oxygen-rich atmosphere.

Figure 3:
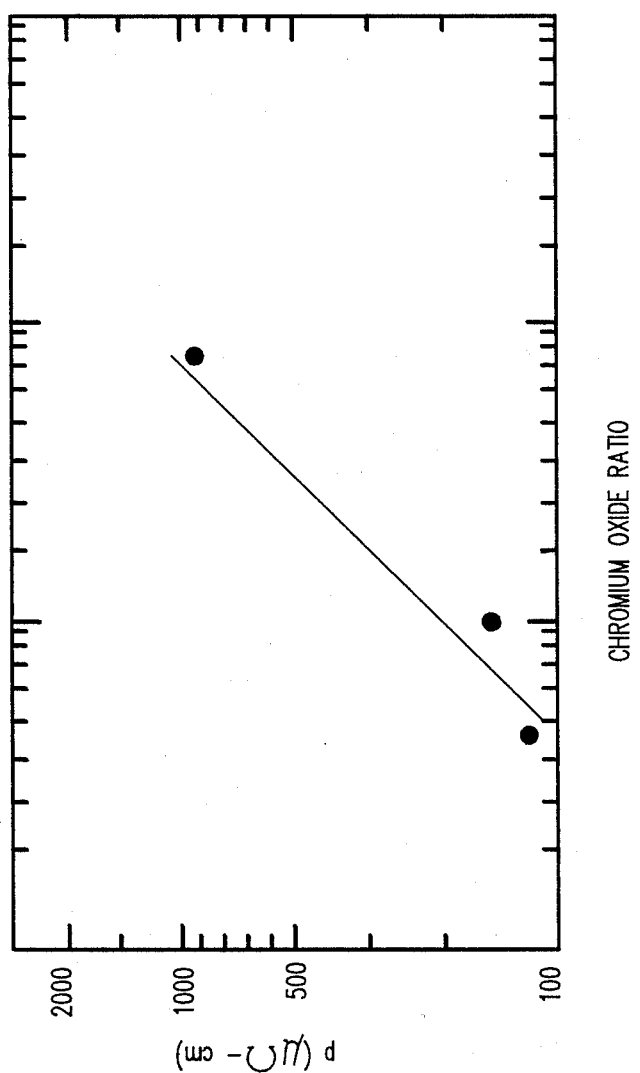
FIG. 3 is a graph of resistivity of the spacer layer as a function of the ratio of nichrome and chromium oxide in the spacer layer.

A further way to obtain this result is by dual-target co-sputtering with targets of high purity nichrome and Cr$_2$O$_3$. FIG. 3 shows a graph of the resistivity that can be achieved as a function of the concentration ratio of NiCr/CrO$_x$. This graph shows the fraction that is proportional to the amount of CrO$_x$ that is present in the films as measured by Auger spectroscopy.

An alternate embodiment of the present invention will be described briefly in conjunction with FIG. 2. The magnetic read head comprises a magnetoresistive (MR) sensor 22, having an MR layer 10 which is formed of magnetic material, and a nonmagnetic spacer layer 24 covering only the central region 28 of the MR layer 10. A thin film of soft magnetic material 30 extends over and in contact with the end regions 32 of the MR layer 10 and in contact with the spacer layer 24 in the central region 28 so that the thin film of soft magnetic material 30 is separated from the MR layer 10 in the central region 28 but in contact with the MR layer 10 in the end regions 32. This structure makes it possible to provide transverse bias to the MR sensor in the central region only, where actual sensing of data is accomplished. Additional layers (not shown) to provide longitudinal bias and electrical leads may also be provided as in the FIG. 1 embodiment.

Figure 2:
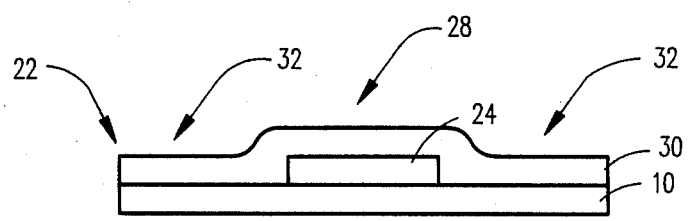
FIG. 2 is an end view of an alternate embodiment of a magnetoresistive read transducer according to the present invention.

In the embodiment of the invention shown in FIG. 2, the spacer layer 24 comprises nichrome (NiCr) or nichrome with chromium oxide additions (NiCrO$_x$). The electrical and materials properties of the spacer layer 24 are the same as those described in conjunction with the FIG. 1 embodiment of the invention.

The preferred way of patterning the spacer layer 24 is by a wet chemical etching process. In cases where the adjacent MR layer 10 comprises a NiFe alloy, this creates a problem since an effective chemical etchant should have a highly differential etch rate between the material of the spacer layer 24 and that of the MR layer 10. Since both are Ni-base alloys, of similar composition ($Ni_{80-60}Cr_{20-40}$ and $Ni_{80}Fe_{20}$ respectively), such an etchant is difficult to find. However, one wet chemical etchant that offers an etch ratio of >200 comprises an aqueous solution of ceric ammonium nitrate and acetic acid (100 mL, 15 gr and 3.5 mL). This etching solution thoroughly dissolved nichrome films at an etch rate exceeding 900 angstroms per minute. This high etch rate holds for all the different nichrome compositions tried regardless of their $p$ values.

The ability to selectively etch the spacer layer 24 without attacking the underlying MR layer 10 significantly reduces the complexity of the manufacturing operation for the FIG. 2 embodiment of the MR sensor 22. The sequence for that manufacturing process is shown in FIG. 4 A-E. In the step of the process shown in FIG. 4A, the MR layer 10 and the spacer layer 24 are deposited as full films on a suitable substrate (not shown) by any suitable thin film deposition process. The preferred deposition process is sputtering. A suitable masking material such as a photoresist material 26 is deposited and patterned to the desired shape as shown in FIG. 4B so that the spacer layer 24 is masked in the central region of the MR layer 10. The unmasked areas of spacer layer 24 are then removed as shown in FIG. 4C by an etching process by the use of a wet chemical etchant comprising an aqueous solution of ceric ammonium nitrate and acetic acid. The photoresist material 26 is then removed and the soft magnetic bias film 30 is then deposited by a sputtering process as shown in FIG. 4D. The soft magnetic film 30 extends over the entire sensor so that it is in contact with the MR layer 10 in the end regions 32 and separated from the MR layer 10 in the central region 28 by the spacer layer 24. The MR sensor 22 is then formed as shown in FIG. 4E by an appropriate etching process to shape the MR sensor 22 to the desired configuration.

It can be seen that the use of nichrome or nichrome with chromium oxide additions as spacer materials in MR sensors permits considerable design and manufacturing improvements. This use also affords many materials and process advantages as well as added flexibility to design modification and extension.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new, and desire to secure by Letters Patent is:

1. A magnetoresistive read transducer comprising:
   a thin film of magnetoresistive conductive layer formed of ferromagnetic material;
   a thin film spacer layer in contact with said magnetoresistive layer, said thin film spacer layer comprising a material selected from the group consisting of nichrome and nichrome with chromium oxide; and
   a thin film of soft magnetic material in contact with said thin film spacer layer so that said thin film of soft magnetic material is positioned parallel to but spaced from said magnetoresistive layer whereby a transverse bias can be produced in at least a part of said magnetoresistive layer to maintain said transverse biased part of said magnetoresistive layer in a linear response mode.

2. The magnetoresistive read transducer of claim 1 wherein said thin film spacer layer extends over only the central region of said magnetoresistive layer.

3. The magnetoresistive read transducer of claim 1 wherein the resistivity of said spacer layer is established by selecting the ratio of nichrome to chromium oxide in said spacer layer.

4. The magnetoresistive read transducer of claim 3 wherein said thin film spacer layer extends over only the central region of said magnetoresistive layer.

* * * * *